(12) United States Patent
Kenefic

(10) Patent No.: US 8,103,532 B2
(45) Date of Patent: Jan. 24, 2012

(54) METHOD AND SYSTEM FOR FAST LOCAL SEARCH AND INSERTION HEURISTICS FOR VEHICLE ROUTING

(75) Inventor: Richard J. Kenefic, Ft. Wayne, IN (US)

(73) Assignee: Raytheon Company, Waltham, MA (US)

( * ) Notice: Subject to any disclaimer, the term of this patent is extended or adjusted under 35 U.S.C. 154(b) by 571 days.

(21) Appl. No.: 12/257,152

(22) Filed: Oct. 23, 2008

(65) Prior Publication Data

US 2010/0106539 A1 Apr. 29, 2010

(51) Int. Cl.
*G06Q 10/00* (2006.01)
(52) U.S. Cl. .................................................. 705/7.11
(58) Field of Classification Search .................. None
See application file for complete search history.

(56) References Cited

U.S. PATENT DOCUMENTS

| 6,418,398 | B1 | 7/2002 | Dueck et al. |
| 6,826,549 | B1 | 11/2004 | Marks et al. |

OTHER PUBLICATIONS

"MACS-CRPTW: A Multiple Ant Colony System For Vehicle Routing Problems With Time Windows", Gambardella et al, New Ideas in Optimization, p. 63-76, 1999.*

"Frugal or Fuelish", Electrical Wholesaling, v89, n7, Jul. 1, 2008.*
Luca Maria Gambardella, Eric Taillard and Giovanni Agazzi, MACS-VRPTW: A Multiple Ant Colony System For Vehicle Routing Problems With Time Windows, Technical Report Idsia, Lugano, Switzerland, 1999, pp. 1-17.
Eric Taillard, Philippe Badeau, Michel Gendreau, Francois Guertin and Jean-Yves Potvin, a Tabu Search Heuristic for the Vehicle Routing Problem with Soft Time Windows, Transportation Science, vol. 31, 1997.
Jorg Homberger and Hermann Gehring, Two Evolutionary Metaheuristics for the Vehicle Routing Problem with Time Windows, Fern Universitat Hagen, Lehrstuhl Wirtschaftsinformatik, Profilstr. 8, D-58084 Hagen, Bundesrepublik, Deutschland, pp. 1-45.
Russell Bent, Pascal Van Hentenryck, a Two-Stage Hybrid Local Search for the Vehicle Routing Problem with Time Windows, Brown University, Providence, Rhode Island, Transportation Science, vol. 38, No. 4, Nov. 2004, pp. 515-530.

* cited by examiner

*Primary Examiner* — Rutao Wu

(74) *Attorney, Agent, or Firm* — Daly, Crowley, Mofford & Durkee, LLP

(57) ABSTRACT

Methods and systems to reduce vehicle travel time in a vehicle routing plan having vehicle routes which includes vehicles and customers serviced by the vehicles, including executing cross-exchanges of the customers for combinations of vehicle routes in the vehicle routing plan.

16 Claims, 11 Drawing Sheets

METHOD AND SYSTEM FOR FAST LOCAL SEARCH AND INSERTION HEURISTICS FOR VEHICLE ROUTING

BACKGROUND

The vehicle routing problem is a combinational optimization problem that seeks to provide an optimal vehicle routing plan for servicing customers with a fleet of vehicles. Many distribution and transportation systems use the vehicle routing problem as an important planning component, including banking systems, postal services, school bus routing, and security patrol services. A standard two-part objective of the vehicle routing problem is to minimize the number of routes or vehicles and the total travel time of the vehicles.

The vehicle routing problem with time windows (VRPTW) is an extension of the vehicle routing problem that requires customers to be serviced within a time window. VRPTW involves a number of customers with known demands and a fleet of identical vehicles with known capacities. The problem includes finding a vehicle routing plan including a set of vehicle routes originating and terminating at a central depot. The vehicle routing plan must service each customer exactly once and the vehicle routes cannot violate the known capacity constraints of the vehicles.

Military systems may use VRPTW to supply troops in the field. Supply operations involve varying levels of autonomy and mission complexity and may service the troops using unmanned air vehicles, unmanned ground vehicles (UGV), and unmanned underwater vehicles. One example of a UGV is the multi-function utility logistics and equipment (MULE) vehicle, which is a 2.5 ton vehicle that can transport equipment and supplies to support dismounted maneuver forces. The MULE can efficiently perform supply operations at the battalion level over geographic areas as large 100 square kilometers. Such operations may be divided into smaller scale missions to support troops at the company and platoon level.

SUMMARY

The inventive systems, techniques, and concepts described herein provide fast local search and insertion heuristics to find near-optimal solutions for a vehicle routing problem with time windows (VRPTW). For example, the inventive systems, techniques, and concepts can provide a near-optimal vehicle routing plan for a fleet of unmanned ground vehicles (UGV) supplying troops in the field. The troops have supply requirements which UGVs must meet within a time window and the UGV routing plan may be planned and re-planned using the inventive techniques over a relatively short time scale, for example, every minute. The inventive systems, techniques, and concepts recognize when near-optimal vehicle routing plans have been rediscovered to facilitate an early exit from the fast local search and insertion heuristics, thereby reducing solution time and resources.

In one exemplary embodiment incorporating the inventive systems, techniques, and concepts, a vehicle routing plan may be initialized using any method known in the art. For example, the nearest neighbor algorithm can be used to find an initial set of vehicle routes to serve customers in a vehicle routing plan. Various heuristic methods known in the art can use the initial vehicle routing plan to seed and generate other plans that reduce the travel time or distance between customers and/or the number of vehicles in the routing plan. For example, the Multiple Ant Colony System (MACS) meta-heuristic can be used to define two colonies of ants, one colony charged with minimizing the travel time or distance of the vehicles between customers in the vehicle routing plan and the other colony charged with reducing the number of vehicles in the vehicle routing plan. Each of the colonies may include one or more ants, wherein each ant includes of a complete vehicle routing plan.

In one aspect, the inventive systems, techniques, and concepts provide a fast local search for finding minimal travel distance in a vehicle routing plan, for example, for one of the MACS ants described above. Cross-exchanges of customers in vehicle routes are locally searched in order to determine the best customer cross-exchange between or within vehicle routes resulting in a minimal travel distance. The length of the local search may be limited to reduce solution time and resources. The best customer cross-exchanges between each set of vehicle routes or within a vehicle route are saved in a cross-exchange matrix, along with the customers involved in each cross-exchange. The saved cross-exchanges in the cross-exchange matrix are examined to determine and derive a new vehicle routing plan with the best cross-exchanges performed. For example, the cross-exchange matrix may be searched to find the cross-exchange with the minimal travel time or distance in a vehicle routing plan or, alternatively, the maximum time savings. The vehicle routing plan is modified by performing the cross-exchange and the rows and columns of the cross-exchange matrix associated with the performed cross-exchange are crossed out. The remaining elements of the cross-exchange matrix are examined to find the next best cross-exchanges and the vehicle routing plan is modified with the next best cross-exchanges, and so on, until all the rows and columns of the cross-exchange matrix have been crossed out. The result will be a new vehicle routing plan with realized travel time savings from the previous or seed vehicle routing plan.

In another aspect, the inventive systems, techniques, and concepts reduce a number of vehicles in a vehicle routing plan. A vehicle route in a vehicle route plan is eliminated resulting in one or more unrouted customers. The unrouted customers are inserted or exchanged with routed customers in the remaining vehicles routes, as long as the insertions or exchanges are feasible, i.e., they satisfy the time windows constraints. Feasible insertions may be favored over feasible exchanges. A feasible insertion matrix represents combinations of unrouted customer to vehicle route. For feasible insertions of an unrouted customer into a vehicle route, a minimum time delay or travel time savings is calculated and if the calculated value is less than a saved matrix value (for example, from a prior minimum time delay calculation), the calculated value replaces the saved matrix value. The result after examining feasible insertions is a feasible insertion matrix that includes the minimum time delay or maximum travel time savings for combinations of unrouted customer to vehicle route.

The feasible insertion matrix may be searched to find the feasible customer insertion having the minimal time delay or maximum time savings. The vehicle routing plan is modified by performing the feasible insertion and the row and column of the feasible insertion matrix involved in the feasible insertion are crossed-out. The remaining elements of the feasible insertion matrix are searched to find the next best feasible insertions and the vehicle routing plan is modified by performing the next best feasible insertions, and so on, until all the rows and columns of the feasible insertion matrix have been crossed out. The result will be a new vehicle routing plan with a reduced number of vehicle routes in the plan.

Next, if no unrouted customers remain, the next generation of ant may be examined using the new vehicle routing plan to reduce the travel time and/or reduce the number of vehicles. If unrouted customers still exist after performing all the feasible insertions, then feasible exchanges of uninserted customers into the vehicle routes may be examined and performed. Feasible exchanges are determined prior to the insertion of customers into any route, and the rows and columns of the feasible exchange matrix are crossed out in correspondence with the feasible insertion matrix when insertions are possible. A feasible exchange matrix represents combinations of unrouted customer to vehicle route. The minimum time delay or travel time savings is calculated for feasible exchanges and if the calculated value a previously saved value in the matrix, the calculated value replaces the previously saved value in the matrix. The result after examining every feasible exchange is a feasible exchange matrix having the minimum time delay or maximum travel time savings for combinations of unrouted customer to vehicle route.

The vehicle routing plan is searched to find the best feasible exchange matrix having the minimal time delay or maximum time savings. The vehicle routing plan is modified by performing the best feasible exchange by swapping in and out customers involved in the exchange. The row and column of the feasible exchange matrix involved in the performed exchange are crossed-out. The remaining elements of the feasible exchange matrix are searched to find the next best feasible exchanges, and so on, until all the rows and columns of the feasible exchange matrix have been crossed out. The result will be a new vehicle routing plan with an improved minimum delay in at least one route. Generally, because performing the feasible exchanges results in unrouted customers (including one or more swapped out customers), the feasible insertions and feasible exchanges (if needed) are repeated on the new vehicle routing plan until all customers are routed or no more feasible exchanges that reduce the minimum delay in a route can be found. If no feasible exchanges exist for one or more unrouted customers, then no feasible solution exists for the ant.

In one aspect, inventive systems described herein provide an article including a storage medium having stored instructions thereon that when executed by a machine result in enabling vehicle routing including reducing vehicle travel time and a number of vehicles in a vehicle routing plan having vehicle routes which include vehicles and customers serviced by the vehicles, including executing cross-exchanges of the customers for combinations of vehicle routes in the vehicle routing plan, including determining a travel time or time savings of executed cross-exchanges, saving a cross-exchange resulting in a minimal travel time or maximum travel time savings for vehicle route combinations, and modifying the vehicle routing plan by performing the saved cross-exchange resulting in the minimal travel time or maximum travel time savings until all vehicle route combinations are exhausted. The vehicle routing also includes eliminating one of the vehicles in the vehicle routing plan including performing insertions of unrouted customers and exchanges of unrouted customers with routed customers, including determining a minimum time delay or travel time savings for feasible insertions of an unrouted customer into a vehicle route, saving a feasible insertion of the unrouted customer into the vehicle route resulting in a minimum time delay or maximum travel time savings, determining the minimum time delay or maximum travel time savings for feasible exchanges of an unrouted customer into a vehicle route, saving a feasible exchange of the unrouted customer into the vehicle route resulting in a minimum time delay or maximum travel time savings, modifying the vehicle routing plan by performing the saved feasible insertion resulting in the minimum time delay or maximum travel time savings until all the unrouted customer to vehicle route combinations are exhausted, and modifying the vehicle routing plan by performing the saved feasible exchange resulting in the minimum time delay or maximum travel time savings until all the unrouted customer to vehicle route combinations are exhausted.

Next, the VRPTW will be described in further detail. As is known in the art, the VRPTW has been partitioned into a heuristic for reducing the travel distance between customer locations and a heuristic for minimizing a number of vehicles in the vehicle routing plan. The VRPTW can be defined in terms of N customers represented by the numbers $1, 2, \ldots, N$ and a central depot represented by the number zero. The set of all sites can be represented by $[0, 1, 2, \ldots, N]$. The travel cost between sites i and j can be denoted as $C_{ij}$. Every customer i has a demand $q_i \geq 0$, and a service time $s_i \geq 0$, which is the amount of time required to service customer i.

Vehicles can be defined in terms of M identical vehicles, each vehicle having a capacity Q. A vehicle route originates at the central depot, visits a number of customers not more than once, and terminates at the central depot. A vehicle route r may be defined as a sequence of visits $\{0, v_1, v_2, \ldots, v_n, 0\}$. Customers of vehicle route r may be denoted as cust(r), and the size of vehicle route r may be denoted by $|r|$. The service demand of a vehicle route may be denoted by q(r), which is the sum of the demands of the customers in the vehicle route as in the following equation:

$$q(r) = \sum_{c \in cust(r)} q_c.$$

A route satisfies its capacity if $q(r) \leq Q$. The travel cost of a route r may be denoted by t(r) and is the cost of visiting all of the route's customers, according to the following equation:

$$t(r) = C_{0,v_1} + C_{v_1,v_2} + C_{v_{(n-1)},v_n} + C_{v_n,0}.$$

A vehicle routing plan is a set of vehicle routes $\{r_1, r_2, \ldots, r_m\}$, where $m \leq M$, and every customer is visited exactly once within a single route.

The VRPTW is an extension of the vehicle routing problem in which the customers and the depot have time windows during which vehicles must provide service. The time window of site i can be specified by time interval $[e_i, l_i]$, where $e_i$ and $l_i$ represent the earliest and latest arrival times, respectively, that a vehicle must meet to service the site. Vehicles must arrive at site i before the passing of $l_i$. Further, vehicles may arrive at site i before $e_i$, but vehicles must wait until $e_i$ to service the site. The departure time of customer i, denoted by $\delta_i$, may be defined recursively according to the following equation:

$$\delta_i = \max(\delta_{i-} + C_{i-,i}, e_i) + s_i$$

Here, the departure time for site i equals the maximum of either the departure time for the previous site i− plus the of the travel cost between site i− and site i, or the earliest arrival time for site i. The service time for site i is added to the result.

The earliest arrival time of customer i, denoted by $a_i$, may be defined according to the following equation:

$$a_i = \max(\delta_i + C_{i-,i}, e_i)$$

Here, the earliest arrival time for site i equals the maximum of the departure time for the previous site i− plus the of the travel cost between site i− and site i, or the earliest arrival time for site i. A vehicle routing plan satisfies the time window constraint for customer i on the vehicle route if $a_i \leq l_i$, in other words, if the vehicle arrives at customer i before the passing of the end of the latest arrival time constraint.

A vehicle routing plan σ satisfies the time window constraint for the central depot if $a_0 \leq l_0$. The latest arrival time for customer i that does not violate the time window constraints for customer i and the customers on a route served after customer i, i.e. $C_{i+}$–$C_n$, may be denoted by the following equation:

$$Z_i = \min(Z_{i-} + C_{ii+} - s_i, l_i)$$

Here, the latest arrival time for site i is equal to the maximum of the latest arrival time for the previous customer i– plus the travel cost from customer i to the next customer i+ minus the service time for site i, or the latest arrival time for customer i.

A solution to the VRPTW is a vehicle routing plan σ including j number of routes that satisfies the vehicle constraints and the time window constraints as follows:
Vehicle routes: $q(r_j) \leq Q$; $|j|$ or $m \leq M$.
Customers: $a(r_j) \leq l_0$; $a_i \leq l_i$.

Here, the total capacity for each of the routes $q(r_j)$ must not exceed the total capacity of a vehicle Q, and the total number of vehicle routes $|j|$ must not exceed the number of available vehicles in the fleet M. Further, the earliest arrival time $a(r_j)$ at the central depot must not exceed the latest arrival time constraint of the central depot $l_0$, and the earliest arrival time for each customer on a route $a_i$ must not exceed the latest arrival time constraint for the customer $l_i$.

A vehicle routing plan that satisfies the standard two-part objective of minimizing the total vehicle travel time between customers on the vehicle routes and the number of vehicle routes (vehicles needed to service customers) may be denoted by the following:

$$\min \sum_{1-j} t(r_j).$$

$$\min(j)$$

Here, $t(r_j)$ represents the vehicle travel time on a route, and j is the number of routes.

BRIEF DESCRIPTION OF THE DRAWINGS

The foregoing features of this invention, as well as the invention itself, may be more fully understood from the following description of the drawings in which:

FIGS. 3A, 3B, and 3C are pictorial representations of various stages of an exemplary cross-exchange of customers between two routes of the type which may be used in the fast local search of FIG. 1;

FIG. 4A is a pictorial diagram of an exemplary cross-exchange matrix showing minimal travel times for route combinations of the type which may be used in the fast local search of FIG. 1;

FIG. 4B is a pictorial diagram of the cross-exchange matrix of FIG. 4A having rows and columns crossed-out for an exemplary performed cross-exchange of the type which may be used in the fast local search of FIG. 1;

FIG. 4C is a pictorial diagram of the cross-exchange matrix of FIG. 4A having rows and columns crossed-out for two exemplary performed cross-exchanges of the type which may be used in the fast local search of FIG. 1;

DETAILED DESCRIPTION

Figure 1:
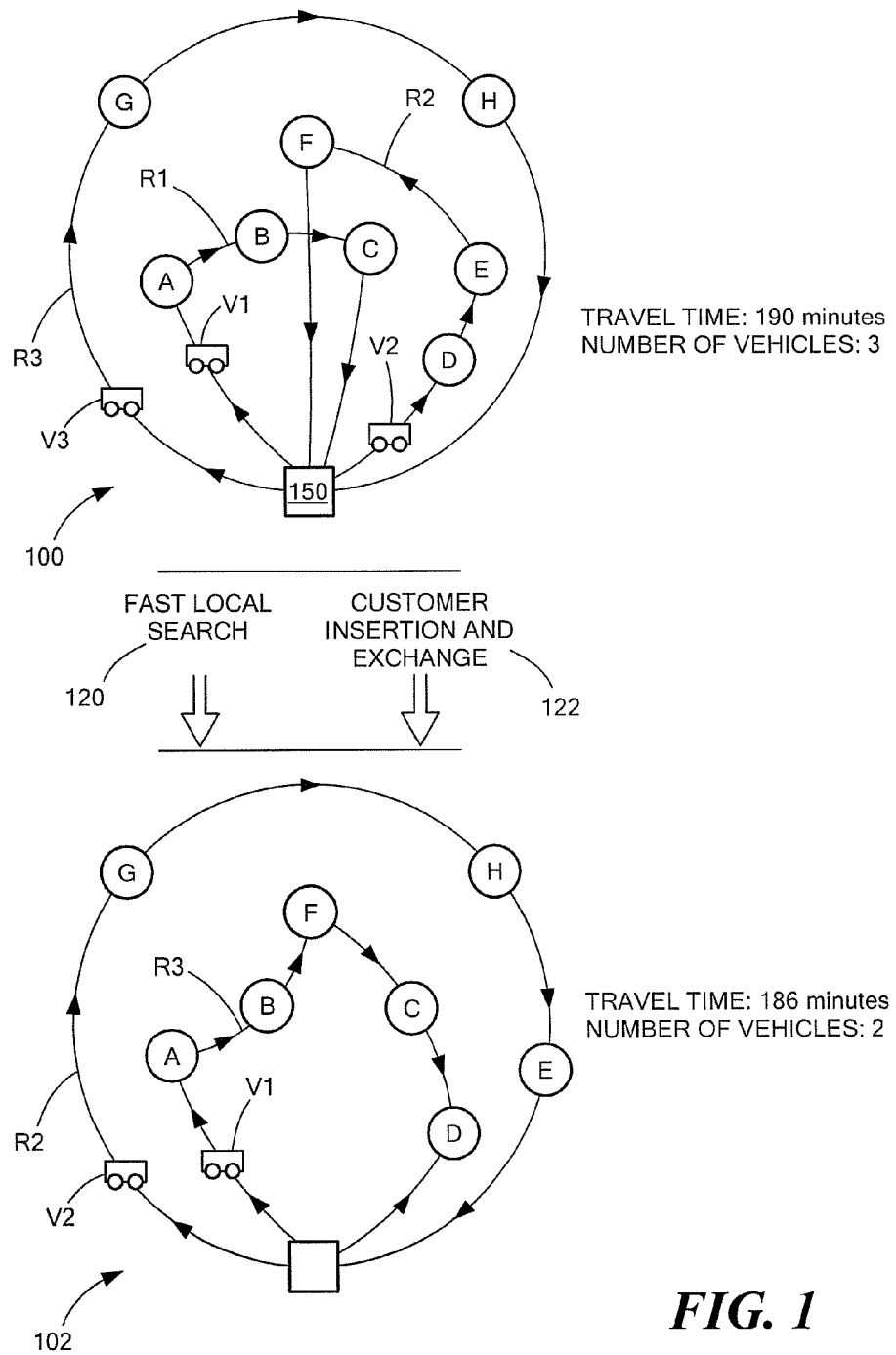
FIG. 1 is a pictorial representation of a seed vehicle routing plan operated on by fast local search and customer insertion and exchange techniques to produce a vehicle routing plan in which vehicle travel time and a number of vehicles is reduced in accordance with the techniques described herein.

FIG. 1 shows a simplified pictorial representation of an exemplary vehicle routing plan 100, including three vehicles V1, V2, and V3 traveling over three respective vehicle routes R1, R2, and R3. The routes service eight customers A, B, C, D, E, F, G, and H. For illustrative purposes, the exemplary vehicle routing plan of FIG. 1 (as well as other exemplary vehicle routing plans described herein) includes a small number of routes, vehicles, and customers, however, the inventive systems, concepts, and techniques may be applied to vehicle routing plans having any number of vehicles and customers. Each of the routes R1, R2, and R3 originates and terminates at a central depot 150. Vehicle V1 services customers A, B, and C, vehicle V2 services customers D, E, and F, and vehicle V3 services customers G and H.

The inventive systems, techniques, and concepts provide a fast local search 120 to minimize vehicle travel time and/or a customer insertion and exchange 122 to minimize a number of vehicles in the vehicle routing plan 100. For example, the three vehicles V1, V2, and V3 traveling over the three routes R1, R2, and R3 can have respective travel times of 62 minutes, 65 minutes, and 63 minutes for a total travel time of 190 minutes to complete the plan 100. The fast local search 120 and customer insertion and exchange 122 can be applied to the vehicle routing plan 100 to derive vehicle routing plan 102 defined by two routes R1 and R2 having respective travel times of 108 minutes and 78 minutes and a total travel time of 186 minutes, an improvement of four minutes over the original plan 100. Further, the vehicle routing plan 102 includes one fewer vehicle than the original plan 100.

An exemplary embodiment of the inventive systems, techniques, and concepts related to a fast local search to minimize travel time in a vehicle routing plan will now be described in more detail. As explained above, an initial vehicle routing plan may be generated using, for example, the nearest neighbor algorithm. It will be understood, however, that most any method may be used that is capable of generating a set of vehicle routes given a set of customers with service needs and a set of fleet vehicles. Further, more than one vehicle routing plan may be generated and each may be used to simultaneously generate further plans using the fast local search.

As described above, a meta-heuristic may be used to generate multiple vehicle routing plans for performing the fast local search. For example, the MACS meta-heuristic may be used to create colonies of one or more ants defining a vehicle routing plan. The fast local search may then be applied to each ant to generate a vehicle routing plan that reduces travel time. This procedure may be repeated until a criterion is reached for terminating the fast local search. For example, the fast local search may terminate when no more feasible plans can be generated from the ant.

A cross-exchange matrix may be created representing every combination of vehicle routes in a vehicle routing plan. In general, a cross-exchange matrix may be represented by elements $M_{ij}$, where i and j are the respective number of rows and columns equal to the number of routes in the vehicle routing plan.

Figure 2:
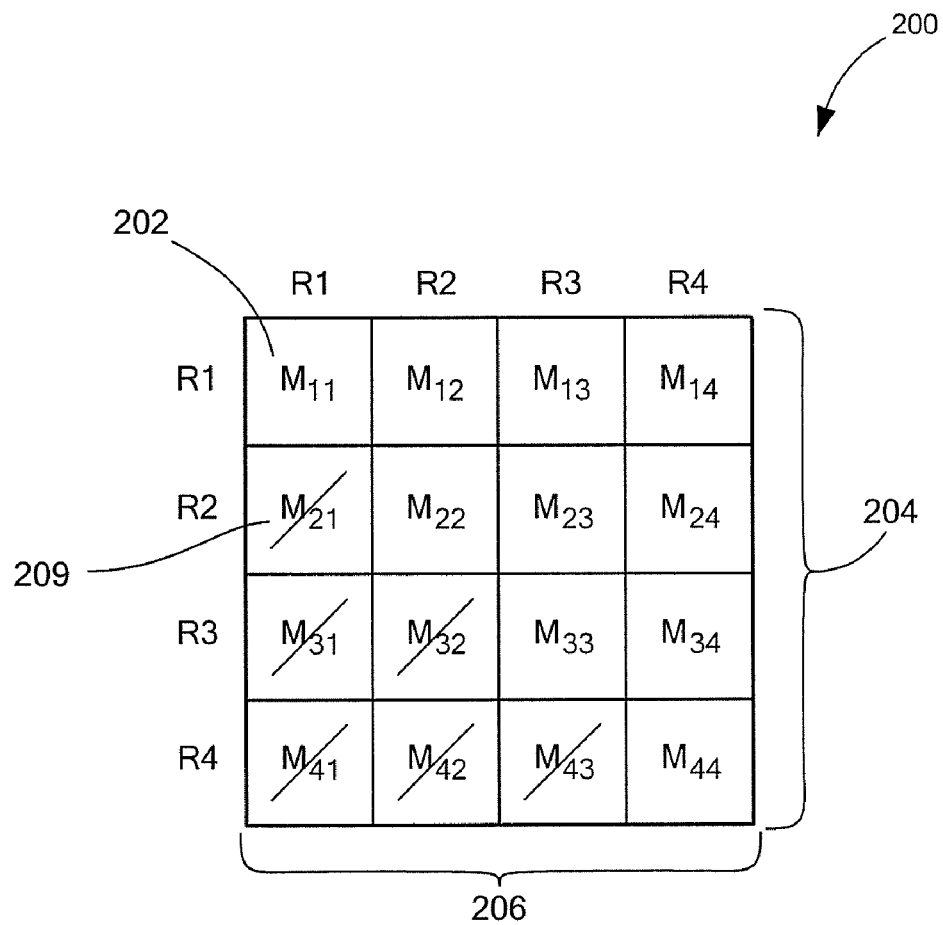
FIG. 2 is a pictorial diagram of an exemplary cross-exchange matrix of the type which may be used in the fast local search of FIG. 1.

Referring now to FIG. 2, an exemplary embodiment of a cross-exchange matrix 200 is shown representing all route combinations of four vehicle routes R1, R2, R3, and R4 in a vehicle routing plan, including every combination of vehicle route with itself. The cross-exchange matrix 200 includes sixteen elements $M_{11}$,-$M_{44}$ representing combinations 202 of the routes in rows 204 and columns 206. However, because each route combination is represented by two matrix elements, duplicate route combination elements may be blocked out. For example, the combination of route R1 and route R2 is represented by matrix element $M_{12}$ and $M_{21}$, and one of the duplicate elements, for example $M_{21}$ 209, may be blocked out.

All of the feasible cross-exchanges are examined for each of the route combinations in the matrix 200. A feasible cross-exchange is any exchange of customers between routes or within a route that satisfies the VRPTW time constraints as described above. In particular, a feasible cross-exchange is any customer exchange in which each customer i in a new route can be serviced in time interval [$e_i$, $l_i$], where $e_i$ and $l_i$ represent the earliest and latest arrival times for customer i. Further, the time window constraints for existing route customers and the central depot must be satisfied.

Figure 3C:
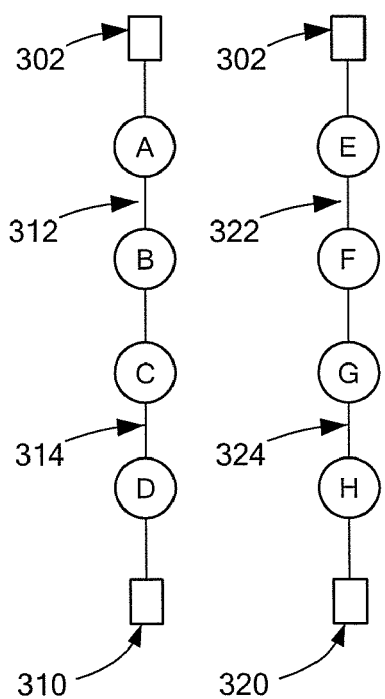
Figure 3C:
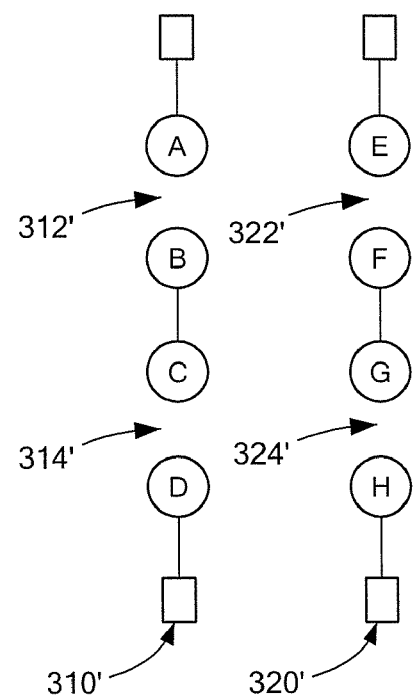
Figure 3C:
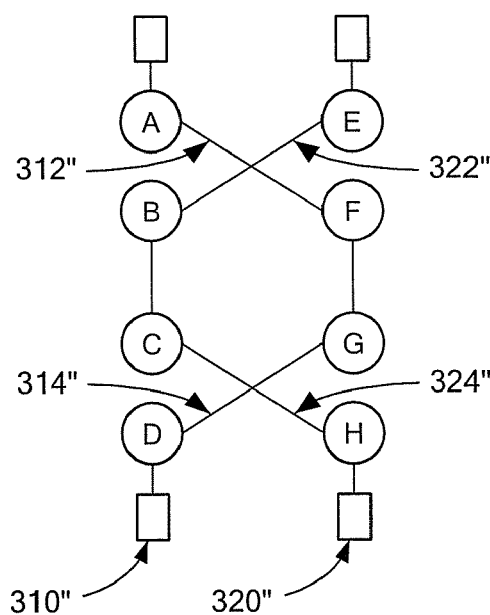

Cross-exchanges will now be described in more detail. An example of various stages of a cross-exchange is shown in FIGS. 3A, 3B, and 3C including a customer cross-exchange between two routes of a vehicle routing plan. Referring to FIG. 3A, each of the routes 310, 320 includes the central depot 302, repeated at the top and bottom of the displayed routes. First route 310 includes customers A, B, C, and D, and second route 320 includes customers E, F, G, and H. A first route portion 312 between customers A and B and a second route portion 314 between customers C and D are removed from first route 310, and a first route portion 322 between customers E and F and a second route portion 324 between customers G and H are removed from the second route 320. Referring to FIG. 3B, in which like elements to FIG. 3A are shown with like reference numerals, first route 310 and second route 320 are shown with route portions 312, 314, 322, 324 (from FIG. 3A) removed, resulting removed portions 312', 314' in first route 310', and removed portions 322', 324' in second route 320'. Referring to FIG. 3C, in which like elements to FIGS. 3A and 3B are shown with like reference numerals, the removed portions 312', 314', 322', 324' (from FIG. 3B) are replaced, resulting in new route portion 312" between customers A and F and new route portion 314" between customers G and D in first route 310", and new route portion 322" between customers E and B and new route portion 324" between customers C and H in second route 320".

Figure 3D:
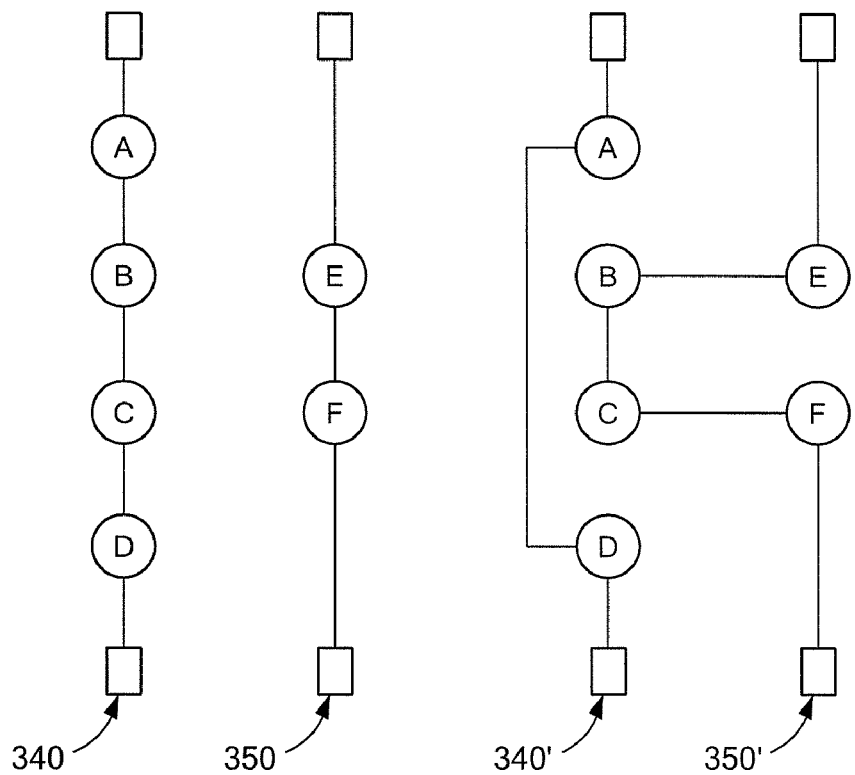
FIG. 3D is a pictorial representation of another exemplary cross-exchange of customers between two routes of the type which may be used in the fast local search of FIG. 1.
Figure 3E:
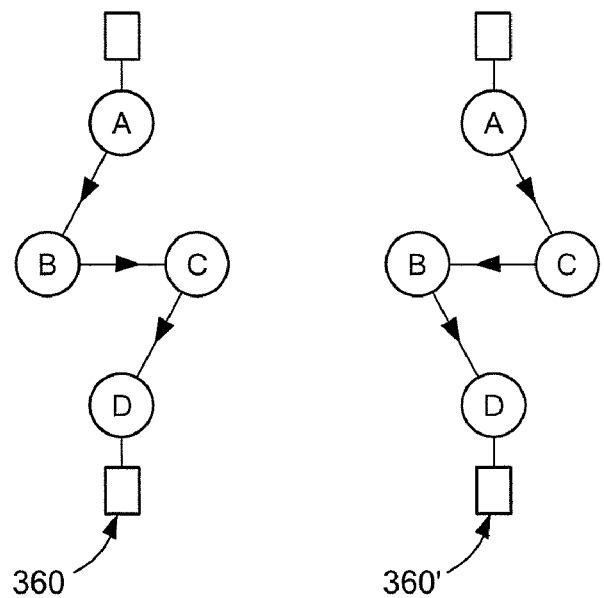
FIG. 3E is a pictorial representation of still another exemplary cross-exchange of customers in a single route of the type which may be used in the fast local search of FIG. 1.

The cross-exchange shown in FIGS. 3A, 3B, and 3C is an example of an exchange in which portions of routes are exchanged with each other. It will be understood, however, that other types of exchanges may be incorporated and examined. For example, FIG. 3D shows an embodiment of a cross-exchange between a first route 340 and second route 350 in which customers B and C are removed from first route 340 and inserted into second route 350 between customers E and F, resulting in new first route 340' new second route 350'. In still another embodiment shown in FIG. 3E, an exchange known as a 2-opt exchange may involve only one route 360. For example, the order of customers ABCD in the route 360 may be exchanged with a new order of customers ACBD in new route 360'.

It will be understood that cross-exchanges may involve route portions having more than two customers. Referring again to FIG. 3A, first route portion 312 may further include customers A1, A2, and A3 between customers A and B. It will also be further understood that the lengths of the chains of customers to be exchanged between routes can be limited to save VRPTW solution time and when an exchange of a given length is not feasible, any longer chain will also not be feasible.

For each feasible cross-exchange, the travel time between the customers in the new routes (or route) is determined. The travel time may be defined as the amount of time a vehicle spends traveling between customers in the vehicle routing plan. Alternatively, the travel distance may be determined. It makes no difference whether travel time or distance is used as long as the speed of the vehicle is constant.

The first travel time (or distance) is determined for a particular route combination and is saved in the corresponding cross-exchange matrix element, along with the customers involved in the cross-exchange. The route portions involved in the cross-exchange may also be saved. Next, for every other feasible cross-exchange for the particular route combination, the travel time is determined, and if the travel time is less than that currently saved in the matrix, the new travel time is saved in the matrix element, along with the customers involved in the cross-exchange, etc. After all feasible cross-exchanges have been examined for the particular route combination, the cross-exchange matrix element will include the minimal travel time (or distance) cross-exchange for the particular route combination in the vehicle routing plan, along with the customers involved in the cross-exchange.

Further, once all feasible cross-exchanges have been examined for all route combinations in the vehicle routing plan, the feasible cross-exchange matrix will include the saved minimal travel time (or distance) cross-exchange for every route combination in the vehicle routing plan. The prior example used travel time to determine whether or not to save cross-exchanges. For example, if a current cross-exchange results in a vehicle routing plan travel time of 54 minutes and a previously saved cross-exchange results in a vehicle routing plan travel time of 57 minutes, the current cross-exchange is saved. In another embodiment, time savings of a cross-exchange can be used instead of vehicle travel time. For example, the above cross-exchange results in a time savings of three minutes, and thus is saved.

Figures 4A, 4B, 4C:
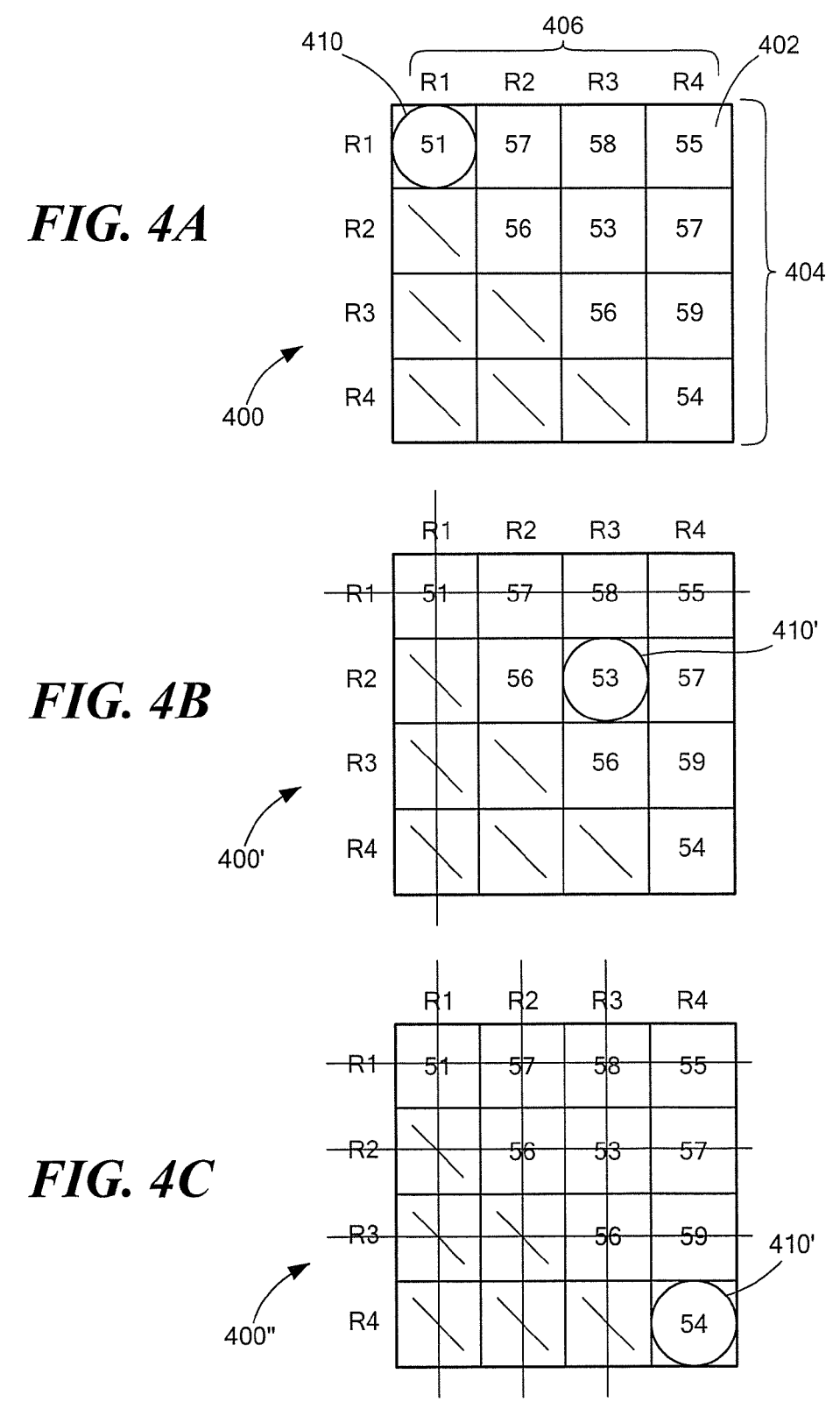

Modification of a vehicle routing plan using a feasible cross-exchange matrix will now be described in more detail. FIG. 4A shows an exemplary embodiment of a feasible cross-exchange matrix 400 for four vehicle routes R1, R2, R3, and R4 of a vehicle route plan. The feasible cross-exchange matrix 400 includes the minimal vehicle travel times 402 of examined cross-exchanges for all the route combinations represented by rows 404 and columns 406. As can be seen by examining the minimal travel time values 402, matrix element $M_{11}$ 410 denotes a smallest minimal travel time value of 51 minutes for the saved values. In other words, the route R1 cross-exchange represented in $M_{11}$ 410 is the smallest determined cross-exchange for all the route combinations in the vehicle routing plan. The vehicle routing plan is modified by replacing route R1 with the route R1 cross-exchange saved in $M_{11}$ 410.

Next, row R1 and column R1 are crossed-out, and the remaining elements of the cross-exchange matrix 400' shown in FIG. 4B are examined to determine the next smallest minimal travel time value. As can be seen by examining the matrix 400', matrix element $M_{23}$ 410' includes the next smallest minimal travel time value of 53 minutes. The vehicle routing plan is modified by replacing routes R2 and R3 with the route R2 and R3 cross-exchange represented in $M_{23}$ 410'. Rows R2 and R3 and columns R2 and R3 are crossed-out, resulting in a cross-exchange matrix 400" shown in FIG. 4C in which $M_{44}$ 410" is the only remaining matrix element. The vehicle routing plan is modified by replacing a route R4 with the route R4 cross-exchange represented in $M_{44}$ 410". Because no more elements are left to examine in the cross-exchange matrix 410", modification and performance of feasible cross-exchanges in the vehicle routing plan may terminate. After the exchanges are complete, the cross exchange matrix may be generated again on the modified vehicle routing plan to determine if any more feasible exchanges that reduce travel time can be found. The local search technique for an ant ends when no more feasible exchanges are found.

The resulting vehicle routing plan, which can be called a next generation of the vehicle routing plan, or, using the MACS heuristic described above, may be referred to as a next generation ant, may be further examined to reduce vehicle travel time by performing newly determined feasible cross-exchanges in the same manner as explained above, and/or to reduce a number of vehicles in the vehicle routing plan by performing feasible insertions of unrouted customers and feasible exchanges of unrouted customers as explained below.

An exemplary embodiment of the inventive systems, techniques, and concepts directed toward customer insertion and exchange to reduce a number of vehicles in a vehicle routing plan will now be described in more detail. In one embodiment, a vehicle route in the vehicle routing plan is eliminated resulting in at least one unrouted customer. The remaining vehicle routes are examined as possible candidates for insertion of the at least one unrouted customer. It will be understood that any appropriate method may be used to select a vehicle route for elimination. For example, the vehicle route may be randomly selected, or the vehicle route with the most or least number of customers may be selected. In the MACS meta-heuristic, the second vehicle reduction colony generates ants using one less vehicle than the first route length reduction colony.

Figure 5A:
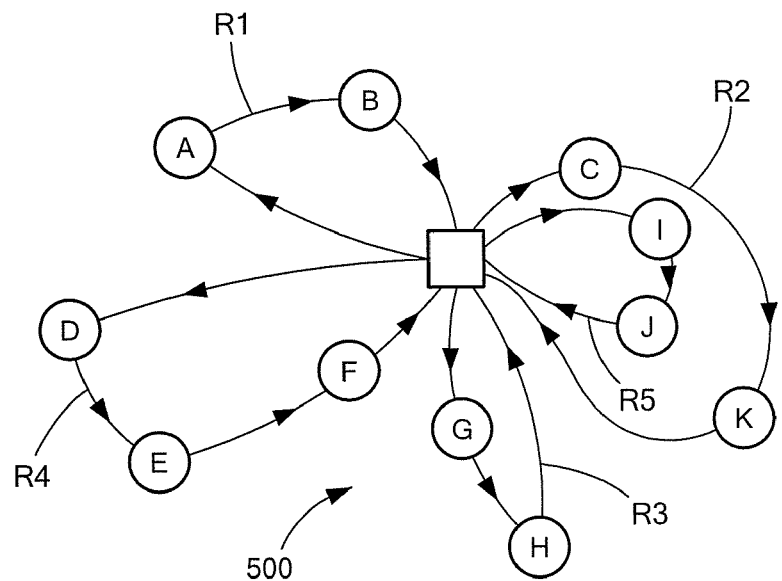
FIG. 5A is a pictorial representation of an exemplary vehicle routing plan for use with the systems, techniques, and concepts described herein.
Figure 5B:
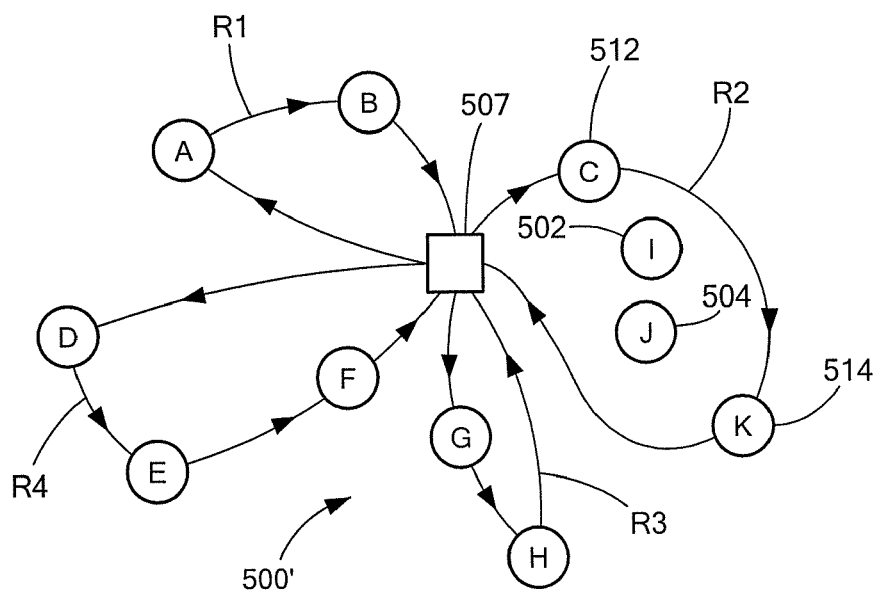
FIG. 5B is a pictorial representation of the vehicle routing plan in FIG. 5A with a vehicle route eliminated resulting in unrouted customers for use with the systems, techniques, and concepts described herein.

Referring now to FIG. 5A, a vehicle routing plan 500 may include five vehicle routes R1, R2, R3, R4, and R5, servicing 11 customers, A, B, C, D, E, F, G, H, I, J, and K. Any of the vehicle routes may be selected for elimination. For example, as shown in FIG. 5B, vehicle route R5 may be eliminated, resulting in a vehicle routing plan 500' with two unrouted customers, namely, customer I 502 and customer J 504. The remaining vehicle routes are examined as possible candidates for insertion of unrouted customers I 502 and J 504.

Figure 6:
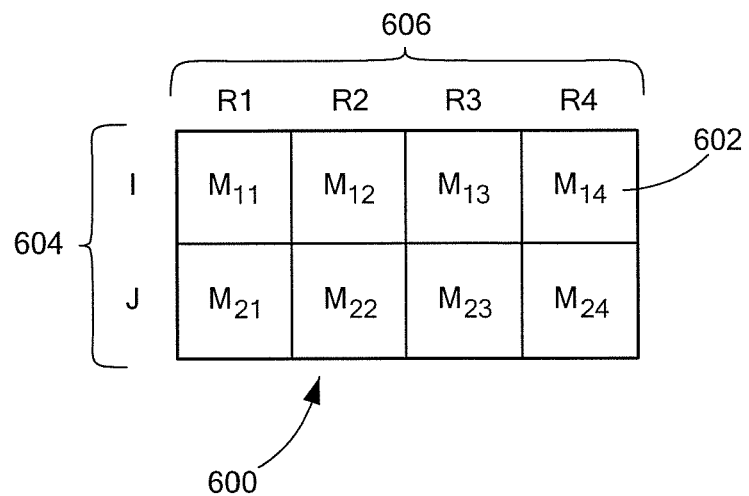
FIG. 6 is a pictorial diagram of an exemplary customer insertion matrix in accordance with the systems, techniques, and concepts described herein.

Referring now to FIG. 6, a feasible insertion matrix 600 may represent every combination of unrouted customers I and J with remaining vehicle routes R1, R2, R3, and R4 in a vehicle routing plan. The feasible insertion matrix 600 includes eight elements $M_{11}$-$M_{24}$ representing combinations 602 of unrouted customers in rows 604 and vehicle routes in columns 606. All feasible insertions are examined for the unrouted customer-to-route combinations in the matrix 600. A feasible insertion of an unrouted customer is any insertion of an unrouted customer into a route that satisfies the VRPTW time constraints described above. It will be understood that, alternatively, customers may be represented in matrix columns and routes in matrix rows.

Feasible insertions of unrouted customer will now be explained in more detail. A particular unrouted customer may be examined for possible insertion into each of the routes in a vehicle routing plan. It may be, however, that an unrouted customer cannot be inserted into a particular route because every examined insertion violates the time constraints of the vehicle routing problem. For example, referring again to FIG. 5B, unrouted customer I 502 may not be able to be inserted into route R4 without violating the time constraints of the vehicle routing plan 500'. Further, it may be that the unrouted customer cannot be inserted into any of the routes in a vehicle routing plan. In such a case, feasible exchanges of the unrouted customer may be examined as will be explained in further detail below. In other instances, however, one or more feasible insertions of the unrouted customer may be possible for a particular route while still satisfying the time constraints of the vehicle routing problem. For example, unrouted customer I 502 may be inserted into route R2 either before customer C 512 and after the central depot 507, before customer K 514 and after customer C 512, or before the central depot 507 and after customer K 514 while still satisfying the time constraints of the vehicle routing plan 500'. In such an instance, three feasible insertions of unrouted customer I 502 exist for route R2, which may be examined to determine the time delay for customers (and the central depot) serviced after the unrouted customer insertion point in route R2. For example, inserting customer I 502 before customer K 514 will cause a time delay in servicing customer K 514 and the central depot 507, but not for customer C 512. The time delay is caused by the time required for a vehicle to travel to and from an inserted customer and the time required to service the inserted customer.

Modification of a vehicle routing plan using a feasible insertion matrix will now be described in detail. A minimal time delay is determined for every feasible insertion of an unrouted customer into a route. A first time delay is determined for an insertion of a particular customer into a particular route and saved in the corresponding matrix element, along with the insertion point information, which may include the next customer after the insertion point and/or the previous customer before the insertion point. One of these values may be the central depot if the insertion point is just after or just before the central depot in the route. Next, for each other feasible insertion of the particular customer into the particular route, the time delay is determined and if the time delay is less than that currently saved in the matrix, the new time delay (representing the minimal time delay determined thus far for the particular combination) is saved in the matrix element, along with insertion point information. After all feasible insertions have been examined for the particular combination, the feasible insertion matrix element will include the saved minimal time delay customer insertion for the particular combination in the vehicle routing plan, along with insertion point information.

Figure 7A:
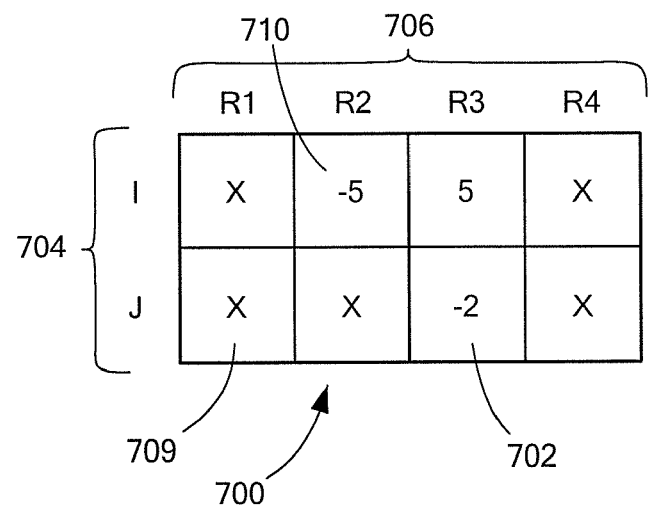
FIG. 7A a pictorial diagram of an exemplary customer insertion matrix showing minimal time delays for feasible customer insertions into routes in accordance with the systems, techniques, and concepts described herein.

Referring to FIG. 7A, an exemplary embodiment of a feasible insertion matrix 700 includes the minimal time delay feasible insertion 702 of examined feasible insertions of unrouted customers into routes in a vehicle routing plan. In FIG. 7A, an "X" in a matrix element indicates that no feasible insertion exists for the particular combination of unrouted customer and vehicle route. For example, the X in matrix element $M_{21}$ 709 indicates that customer J cannot be inserted into route R1 without violating the time constraints of the vehicle routing problem. The vehicle routing plan includes two unrouted customers I and J in rows 704 and four vehicle routes R1, R2, R3, and R4 in columns 706. As can be seen by examining the minimal time delays, matrix element $M_{12}$ 710 includes a smallest minimal time delay of −5 seconds across the entire feasible insertion matrix 700. In other words, inserting customer I into route R2 results in the minimal time delay among all feasible insertions examined in the vehicle routing plan. The vehicle routing plan is modified by inserting unrouted customer I into route R2 at the designated insertion point.

Figure 7B:
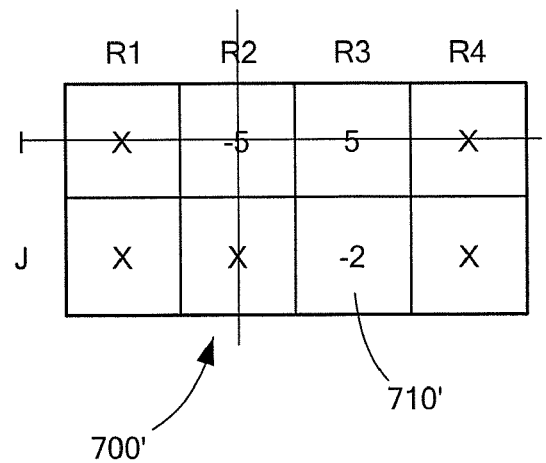
FIG. 7B a pictorial diagram of the customer insertion matrix in FIG. 7A having rows and columns crossed-out for an exemplary performed customer insertion in accordance with the systems, techniques, and concepts described herein.

Next, row I and column R2 are crossed-out, and the remaining elements of the feasible insertion matrix 700' shown in FIG. 7B are examined to determine the next smallest minimal time delay value. As can be seen by examining the matrix 700', matrix element $M_{23}$ 710' includes the next smallest minimal time delay of −2 seconds. In fact, in this example, $M_{23}$ is the only remaining element, however, in other examples involving many more routes and unrouted customers, many more elements may remain for examination at this stage. The vehicle routing plan is modified by inserting unrouted customer J into route R3 at the designated insertion point. Because no more elements are left to examine, modification and performance of feasible insertions in the vehicle routing plan may terminate.

In this example, the unrouted customers were able to be routed in the vehicle routing plan. The resulting vehicle routing plan, which can be called a next generation of the vehicle routing plan, may be further examined to reduce vehicle travel time and/or to reduce a number of vehicles in the vehicle routing plan. As noted above, however, one or more customers may not be able to be inserted into the vehicle routing plan without violating time constraints. If unrouted customers remain after performance of the customer insertions, then exchanges of unrouted customers with routed customer may be examined and performed.

Feasible exchanges of unrouted customer will now be explained in more detail. Referring again to FIG. 5A showing exemplary vehicle routing plan 500, and to FIG. 5B showing vehicle routing plan 500' with route R5 eliminated, if any of the unrouted customers I 502 and J 504 cannot be feasibly inserted into vehicle routing plan 500', then feasible exchanges of unrouted customers I and J are examined. Exchanges of unrouted customers differ from insertions of unrouted customers in that instead of inserting an unrouted customer into a vehicle route resulting in one more customer to be serviced in the vehicle route, the unrouted customer is exchanged for a routed customer in the vehicle route. The exchange, therefore, results in a new unrouted customer, i.e., the customer that was swapped out of the vehicle route. For example, in vehicle routing plan 500' unrouted customer I 502 may be exchanged with routed customer C 512 in route R2, resulting in new unrouted customer C 512. Similar to customer insertions, customer exchanges may result in a time delay for customers (and the central depot) serviced after the exchanged customer in the vehicle route. For example, exchanging customer I 502 for customer C 512 in route R2 may cause a time delay in departing from customer K 514. The time delay is caused by the time required for a vehicle to travel to and from exchanged customer I 502 and the time required to service customer I 502 compared to that required for the exchanged customer C 512. It should be noted that the time delay caused by an exchange may result in a positive or negative delay for a vehicle routing plan. For example, performing a customer exchange in a route may allow a vehicle to depart from a subsequent customer earlier, resulting in a negative delay. Alternatively, the vehicle may depart later, resulting in a positive delay. The purpose of the exchange is to find swaps that result in negative time delays in a route.

Modification of a vehicle routing plan using a feasible exchange matrix will now be described in detail. A minimal time delay is determined for every feasible exchange of an unrouted customer with a routed customer in a route. A first time delay is determined for a particular customer exchange in a particular route and saved in a corresponding feasible exchange matrix element, along with the exchange information, which may include the customers involved in the exchange. Next, for each other feasible exchange of the particular customer with other customers in the particular route, the time delay is determined and if the time delay is less than that currently saved in the matrix, the new time delay (representing the minimal time delay determined thus far for the particular route exchange) is saved in the matrix element, along with exchange information. After all feasible exchanges have been examined for the particular customer in the particular route, the feasible exchange matrix element will include the saved minimal time delay customer exchange for the particular combination in the vehicle routing plan, along with exchange information.

Figure 8A:
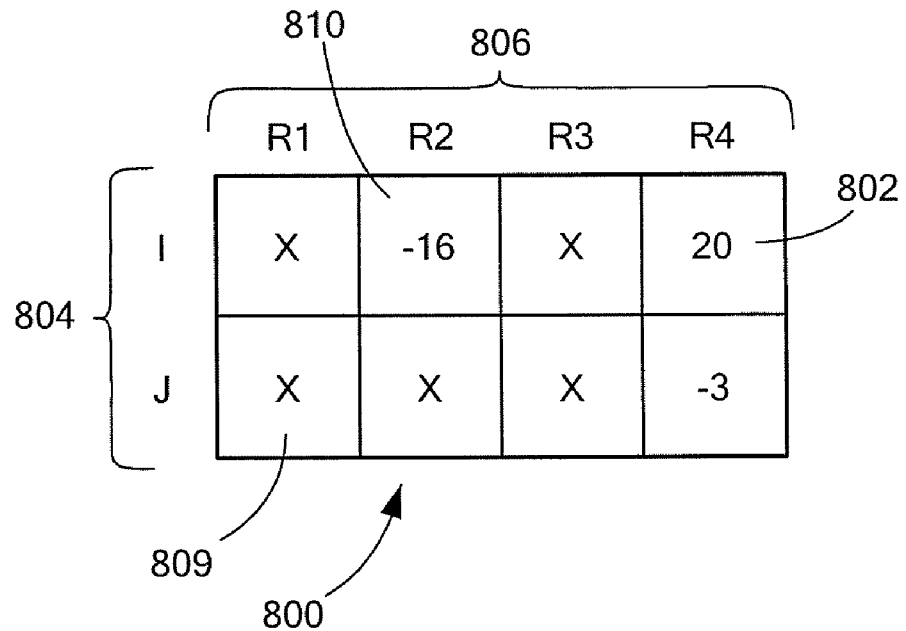
FIG. 8A a pictorial diagram of an exemplary customer exchange matrix showing minimal time delays for feasible customer exchanges of unrouted customers with routed customers in a vehicle routing plan in accordance with the systems, techniques, and concepts described herein.

Referring to FIG. 8A, an exemplary embodiment of a feasible insertion matrix 800 includes the minimal time delay feasible exchange 802 of examined feasible exchanges for every combination of unrouted customer to route in a vehicle routing plan. In FIG. 8A, an "X" in a matrix element indicates that no feasible exchange exists for the particular combination of unrouted customer and vehicle route. For example, the X in matrix element $M_{21}$ 809 indicates that customer J cannot be exchanged with any of the customers in route R1 without violating the time constraints of the vehicle routing problem. The vehicle routing plan includes two unrouted customers I and J in rows 804 and four vehicle routes R1, R2, R3, and R4 in columns 806. As can be seen by examining the minimal time delays, matrix element $M_{12}$ 810 includes a smallest minimal time delay of −16 seconds across the entire feasible exchange matrix 800. In other words, exchanging customer I with another customer, for example customer K, in route R2 results in the minimal time delay among all feasible exchanges in the vehicle routing plan. The vehicle routing plan is modified by performing the exchange of unrouted customer I for the designated routed customer in route R2. The exchange results in a new unrouted customer, for example customer K.

Figure 8B:
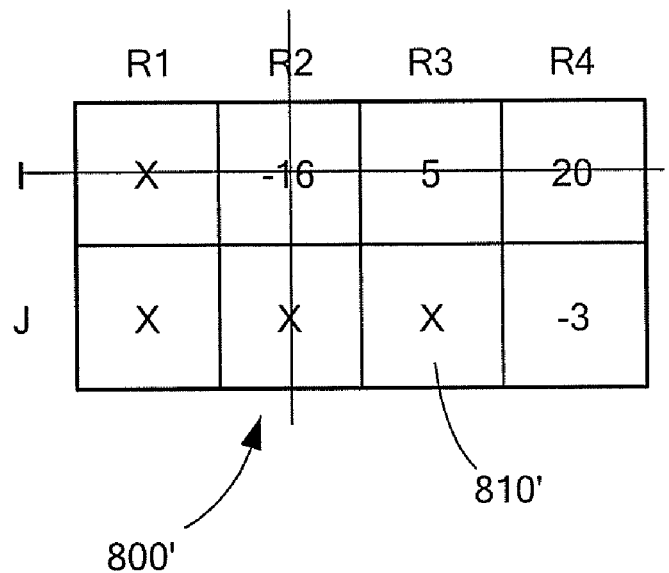
FIG. 8B a pictorial diagram of the customer exchange matrix in FIG. 8A having rows and columns crossed-out for an exemplary performed customer exchange in accordance with the systems, techniques, and concepts described herein.

Next, row I and column R2 are crossed-out, and the remaining elements of the feasible exchange matrix 800' shown in FIG. 8B are examined to determine the next smallest minimal time delay value. As can be seen by examining the matrix 800', matrix element $M_{24}$ 810' includes the next smallest minimal time delay of −3 seconds. In fact, in this example, $M_{24}$ is the only remaining element, however, in other examples involving many more routes and unrouted customers, many more elements may remain for examination at this stage. The vehicle routing plan is modified by exchanging unrouted customer J with another customer in route R4, for example customer F. Because feasible exchanges that resulted in negative time delays were found, customer insertion and exchange may be repeated until either all unrouted customers have been inserted, or no more exchanges that result in a negative time delay can be found.

In this example, the unrouted customers were able to be exchanged for others in the vehicle routing plan. The resulting vehicle routing plan may be further examined to determine if the new set of unrouted customers can be inserted or exchanged. It may be, however, that one or more unrouted customers cannot be exchanged with other customers without violating time constraints of the vehicle routing problem. If unrouted customers cannot be exchanged or inserted, then there is no feasible solution for routing all of the customers in the examined vehicle routing plan. In such a case, the vehicle routing plan may be dropped for consideration as a solution to the VRPTW.

In a further embodiment, the fast local search and/or customer insertion and exchange may be terminated when a particular vehicle routing plan is rediscovered as a near-optimal solution to a vehicle routing problem a certain number of times, for example, two times. A near-optimal solution is determined when a vehicle routing plan that meets the constraints of the vehicle routing problem with a travel time (or distance) that is the smallest found so far in the search technique is rediscovered a set number of times.

In still another embodiment, the fast local search and/or customer insertion and exchange may be terminated after a predetermined execution time has expired, for example, a military re-planning horizon of five minutes to schedule UGV routes to supply troops in the field.

Figure 9:
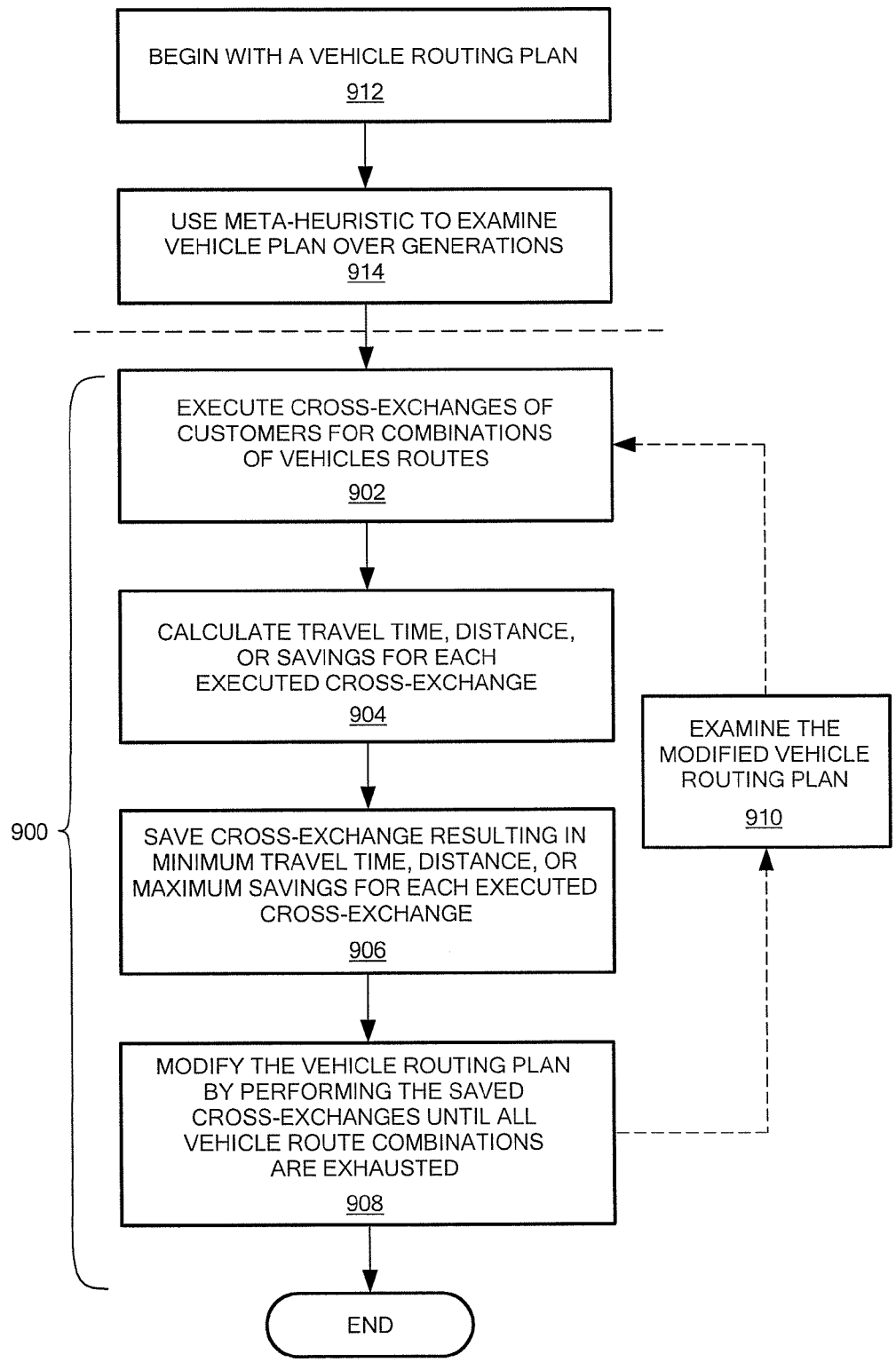
FIG. 9 is a flow diagram of an exemplary embodiment of a method for fast local search in accordance with the systems, techniques, and concepts described herein.

Referring now to FIG. 9, an exemplary embodiment of a method 900 to reduce vehicle travel time in a vehicle routing plan according to the inventive systems, techniques, and concepts described herein includes executing 902 cross-exchanges of routed customers for combinations of vehicle routes in the vehicle routing plan, calculating 904 vehicle travel time, distance, or savings for each executed cross-exchange, and saving 906 cross-exchanges resulting in minimum travel time, distance, or maximum savings for each executed cross-exchange. The cross-exchanges may be saved in a cross-exchange matrix including all combinations of vehicle routes. It will be understood, however, that other methods may be used to save the cross-exchanges including, but not limited to, arrays for each route or linked lists for each route.

The method 900 also includes modifying 908 the vehicle routing plan by performing the saved cross-exchanges until all the vehicle route combinations have been exhausted. In a further embodiment, the method 900 includes examining 910 the modified vehicle routing plan to reduce vehicle travel time in the modified vehicle routing plan.

The vehicle routing problem may begin 912 with a vehicle routing plan created using any known method, for example the nearest-neighbor method, to generate a set of vehicle routes to meet the service needs of customers within the time constraints of the vehicle routing problem. Further, any known meta-heuristic may be used 914 to examine the vehicle routing plan. For example, the MACS meta-heuristic may be used to investigate ants across multiple generations of vehicle routing plans, each successive generation resulting in increased time savings in completing the plan.

Figure 10:
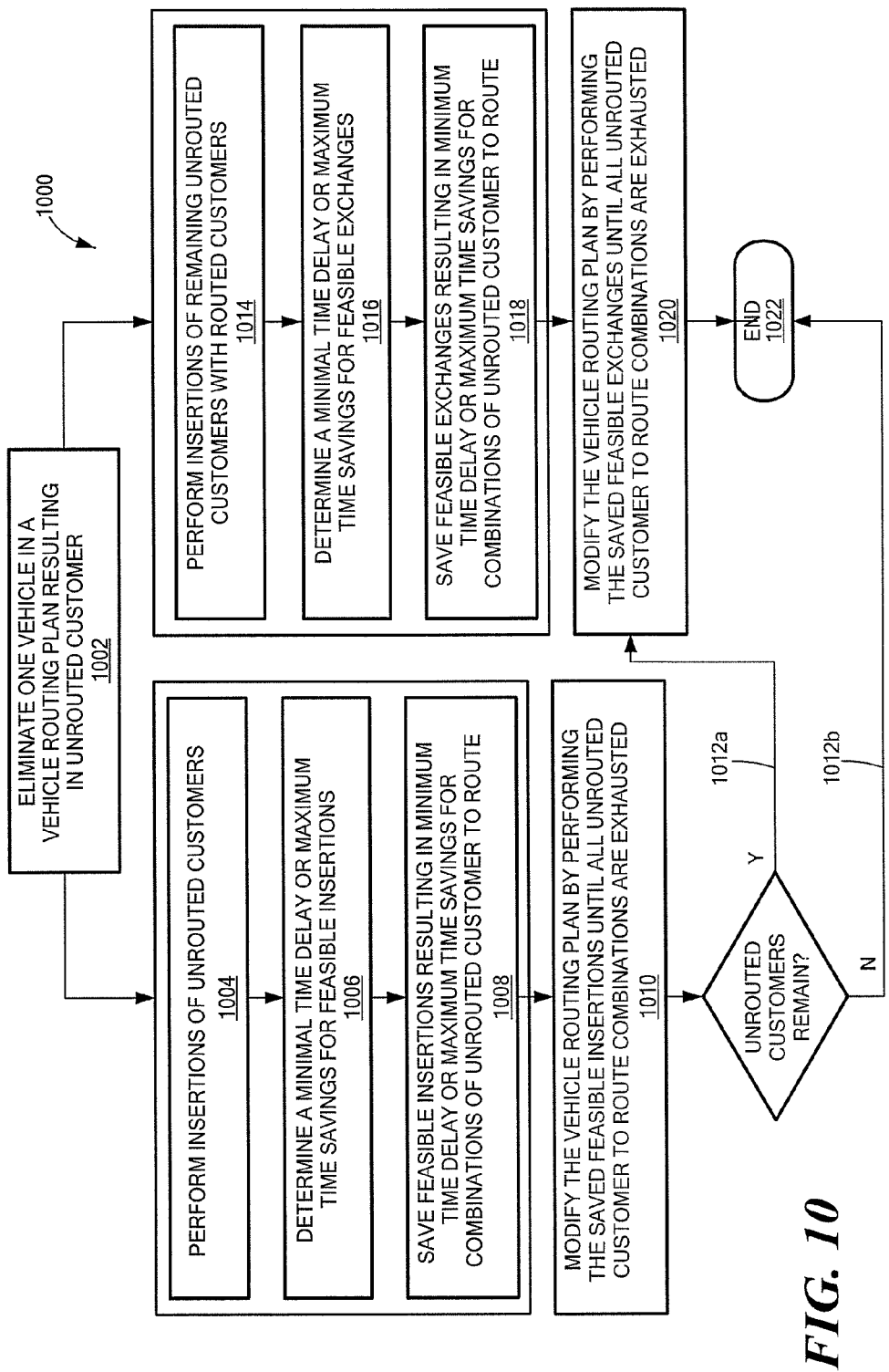
FIG. 10 is a flow diagram of an exemplary embodiment of a method for customer insertion and exchange in accordance with the systems, techniques, and concepts described herein.

Referring now to FIG. 10, an exemplary embodiment of a method 1000 to reduce a number of vehicles in a vehicle routing plan in accordance with the inventive systems, techniques, and concepts described herein includes eliminating 1002 one vehicle in a vehicle routing plan, performing 1004 feasible insertions of unrouted customers, determining 1006 a minimal time delay or maximum time savings for feasible insertions, and saving 1008 feasible insertions resulting in minimum time delay or maximum time savings for combinations of unrouted customer to route. The feasible insertions may be saved in a feasible insertion matrix including all combinations of unrouted customers to vehicle routes. It will be understood, however, that other methods may be used to save the insertions including, but not limited to, arrays for each unrouted customer or linked lists for each unrouted customer.

The method 1000 further includes performing 1014 exchanges of unrouted customers with routed customers, determining 1016 a minimal time delay or maximum time savings for feasible exchanges, and saving 1018 feasible exchanges resulting in minimum time delay or maximum time savings for combinations of unrouted customer to route. The feasible exchanges may be saved in a feasible exchanges matrix including all combinations of unrouted customers to vehicle routes. It will be understood, however, that other methods may be used to save the exchanges including, but not limited to, arrays for each unrouted customer or linked lists for each unrouted customer.

The method 1000 further includes modifying 1010 the vehicle routing plan by performing the saved feasible insertions until all unrouted customer to route combinations are exhausted. If unrouted customers still remain after performing the feasible insertions 1012a, the method 1000 further includes modifying 1020 the vehicle routing plan by performing feasible exchanges that result in a negative time delay until all unrouted customer to route combinations are exhausted. If any exchanges result in a negative time delay 1020, the method 1000 may be repeated. If instead all customers are routed 1012b, there is no need to perform customer exchanges and the method 1000 may be terminated 1022.

Figure 11:
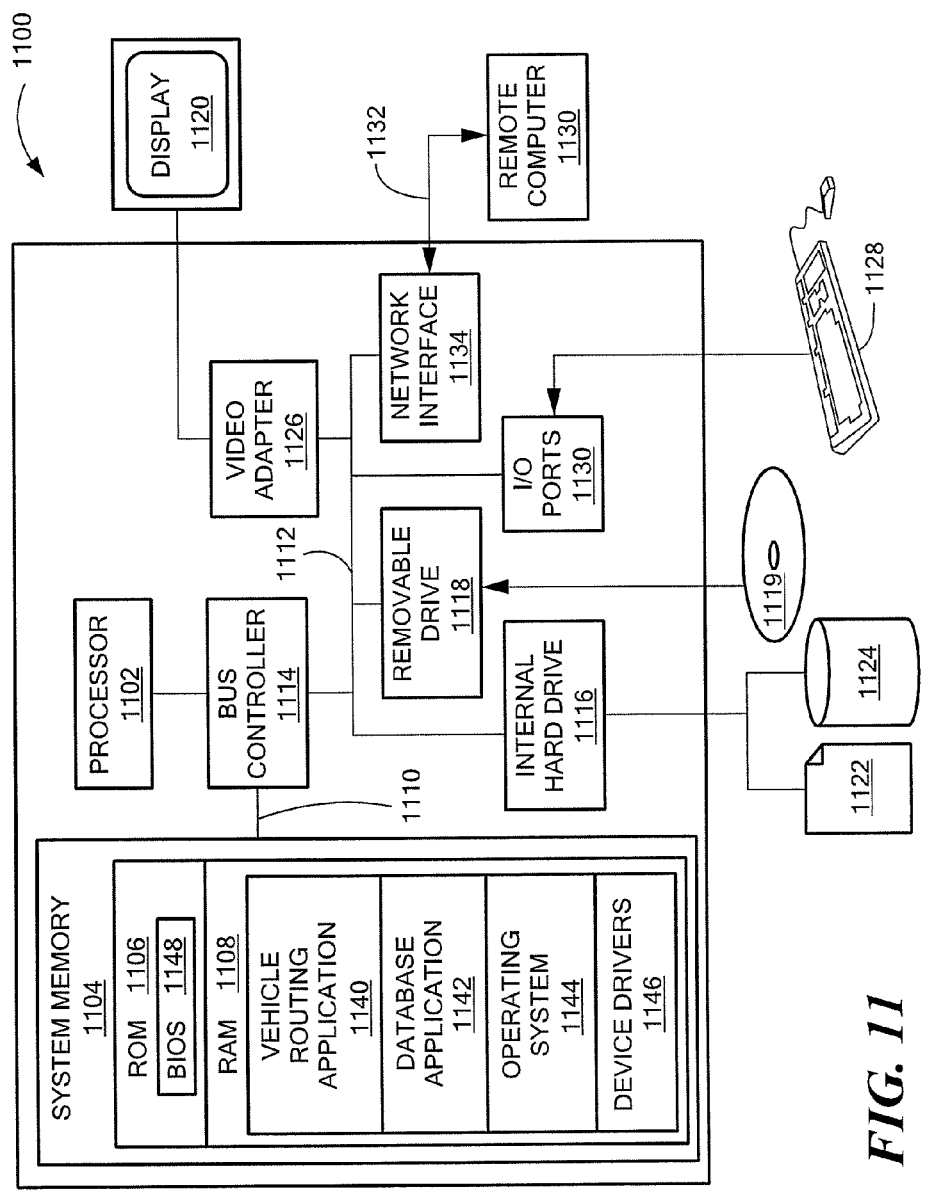
FIG. 11 is a diagram showing an exemplary hardware and operating environment of a suitable computer for use with embodiments of the invention.

FIG. 11 illustrates a computer 1100 suitable for supporting the operation of an embodiment of the inventive systems, concepts, and techniques described herein. The computer 1100 includes a processor 1102, for example, a dual-core processor, such as the AMD Athlon™ X2 Dual Core processor from the Advanced Micro Devices Corporation. However, it should be understood that the computer 1100 may use other microprocessors. Computer 1100 can represent any server, personal computer, laptop, or even a battery-powered mobile device such as a hand-held personal computer, personal digital assistant, or smart phone.

Computer 1100 includes a system memory 1104 which is connected to the processor 1102 by a system data/address bus 1110. System memory 1104 includes a read-only memory (ROM) 1106 and random access memory (RAM) 1108. The ROM 1106 represents any device that is primarily read-only including electrically erasable programmable read-only memory (EEPROM), flash memory, etc. RAM 1108 represents any random access memory such as synchronous dynamic random access memory (SDRAM). The Basic Input/Output System (BIOS) 1148 for the computer 1100 is stored in ROM 1106 and loaded into RAM 1108 upon booting.

Within the computer 1100, input/output (I/O) bus 1112 is connected to the data/address bus 1110 via a bus controller 1114. In one embodiment, the I/O bus 1112 is implemented as a Peripheral Component Interconnect (PCI) bus. The bus controller 1114 examines all signals from the processor 1102 to route signals to the appropriate bus. Signals between processor 1102 and the system memory 1104 are passed through the bus controller 1114. However, signals from the processor 1102 intended for devices other than system memory 1104 are routed to the I/O bus 1112.

Various devices are connected to the I/O bus 1112 including internal hard drive 1116 and removable storage drive 1118 such as a CD-ROM drive used to read a compact disk 1119 or a floppy drive used to read a floppy disk. The internal hard drive 1116 is used to store data, such as in a file 1122 and a database 1124. Database 1124 includes a structured collection of data, such as a relational database. A display 1120, such as a cathode ray tube (CRT), liquid-crystal display (LCD), etc. is connected to the I/O bus 1112 via a video adapter 1126.

A user enters commands and information into the computer 1100 by using input devices 1128, such as a keyboard and a mouse, which are connected to I/O bus 1112 via I/O ports 1130. Other types of pointing devices that may be used include track balls, joy sticks, and tracking devices suitable for positioning a cursor on a display screen of the display 1120.

Computer 1100 may include a network interface 1134 to connect to a remote computer 1130, an intranet, or the Internet via network 1132. The network 1132 may be a local area network or any other suitable communications network.

Computer-readable modules and applications 1140 and other data are typically stored on memory storage devices, which may include the internal hard drive 1116 or the compact disk 1119, and are copied to the RAM 1108 from the memory storage devices. In one embodiment, computer-readable modules and applications 1140 are stored in ROM 1106 and copied to RAM 1108 for execution, or are directly executed from ROM 1106. In still another embodiment, the computer-readable modules and applications 1140 are stored on external storage devices, for example, a hard drive of an external server computer, and delivered electronically from the external storage devices via network 1132.

The computer-readable modules 1140 may include compiled instructions for implementing the fast local search and/or customer insertion and exchange for a vehicle routing application providing vehicle routing solutions to a VRPTW described herein. The solutions may be outputted to display 1120 to enable users to view the solutions. Further, vehicle routing solutions may be outputted to a routing system that sends route commands to vehicles to execute a vehicle routing plan. For example, a military routing system may send route commands to UGVs to supply troops in the field.

In a further embodiment, the computer 1100 may execute fast local search on a first processor and customer insertion and exchange on a second processor. For example, the first and second processor may be respective processors of a dual-core processor. Alternatively, the first and second processor may respective first and second computing devices.

The computer 1100 may execute a database application 1142, such as Oracle™ database from Oracle Corporation, to model, organize, and query data stored in database 1124. The data may be used by the computer-readable modules and applications 1140 and/or passed over the network 1132 to the remote computer 1130 and other systems.

In general, the operating system 1144 executes computer-readable modules and applications 1140 and carries out instructions issued by the user. For example, when the user wants to execute a computer-readable module 1140, the operating system 1144 interprets the instruction and causes the processor 1102 to load the computer-readable module 1140 into RAM 1108 from memory storage devices. Once the computer-readable module 1140 is loaded into RAM 1108, it can be used by the processor 1102 to carry out various instructions. The processor 1102 may also load portions of the computer-readable modules or applications 1140 into RAM 1108 as needed. The operating system 1144 uses device drivers 1146 to interface with various devices, including memory storage devices, such as hard drive 1116 and removable storage drive 1118, network interface 1134, I/O ports 1130, video adapter 1126, and printers.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A computer implemented method to reduce vehicle travel time and a number of vehicles in a vehicle routing plan having vehicle routes which include vehicles and customers serviced by the vehicles, the method comprising:
  in a processor, executing cross-exchanges of the customers for combinations of vehicle routes in the vehicle routing plan, comprising:
    calculating a travel time or time savings of executed cross-exchanges;
    saving, in a cross-exchange matrix comprising combinations of the vehicle routes, a cross-exchange resulting in the minimal travel time or maximum travel time savings for vehicle route combinations; and
    modifying the vehicle routing plan by performing the saved cross-exchange in the cross-exchange matrix resulting in the minimal travel time or maximum travel time savings and eliminating the vehicle route combination row and column of the cross-exchange matrix represented by the performed cross-exchange, and repeating modifying of the vehicle routing plan until all the vehicle route combinations in the cross-exchange matrix have been eliminated;
  in the processor, eliminating one of the vehicles in the vehicle routing plan; and
  in the processor, performing insertions of unrouted customers and exchanges of unrouted customers with routed customers, comprising:
    calculating a minimum time delay or travel time savings for feasible insertions of an unrouted customer into a vehicle route;
    saving, in a feasible insertion matrix representing unrouted customer to vehicle route combinations, a feasible insertion of the unrouted customer into the vehicle route resulting in a minimum time delay or maximum travel time savings;

calculating the minimum time delay or travel time savings for feasible exchanges of an unrouted customer with a routed customer in a vehicle route;

saving, in a feasible exchange matrix representing unrouted customer to vehicle route combinations, a feasible exchange of the unrouted customer into the vehicle route resulting in a minimum time delay or maximum travel time savings;

modifying the vehicle routing plan by performing the saved feasible insertion resulting in the minimum time delay or maximum travel time saving and eliminating the row and column of the feasible insertion matrix and the feasible exchange matrix represented by the performed feasible insertion, and repeating modifying of the vehicle routing plan until all the unrouted customer to vehicle route combinations in the feasible insertion matrix have been eliminated; and modifying the vehicle routing plan by performing the remaining saved feasible exchange resulting in the minimum time delay or maximum travel time savings and eliminating the row and column of the feasible exchange matrix represented by the performed feasible exchange, and repeating modifying of the vehicle routing plan until all the unrouted customer to vehicle route combinations in the feasible exchange matrix have been eliminated.

2. The method of claim 1, further comprising:
terminating the method when no feasible cross-exchanges of customers can be executed in the vehicle routing plan.

3. The method of claim 1, further comprising:
terminating the method when no feasible exchanges of unrouted customers can be executed in the vehicle routes.

4. The method of claim 1, further comprising:
executing the method within a vehicle routing re-planning time period.

5. The method of claim 4, wherein the vehicle routing re-planning time period is five minutes or less.

6. The method of claim 1, wherein executing cross-exchanges is performed on a first processor and eliminating one of the vehicles in the vehicle routing plan and performing insertions and exchanges of unrouted customers are performed on a second processor.

7. The method of claim 1, wherein the modified vehicle routing plan is outputted to enable routing of the vehicles.

8. A computer implemented method for reducing a number of vehicles in a vehicle routing plan having a plurality vehicle routes with each vehicle route including vehicles and customers services by the vehicles, the method comprising:

in a processor, eliminating one of the vehicles in the vehicle routing plan; and in the processor, performing insertions of unrouted customers and exchanges of unrouted customers with routed customers, comprising:

determining a minimum time delay or maximum time savings for feasible insertions of an unrouted customer into a vehicle route;

saving a feasible insertion of the unrouted customer into the vehicle route resulting in a minimum time delay or maximum travel time savings;

determining the minimum time delay or maximum travel time savings for feasible exchanges of an unrouted customer with a routed customer in a vehicle route;

saving a feasible exchange of the unrouted customer into the vehicle route resulting in a minimum time delay or maximum travel time savings;

modifying the vehicle routing plan by performing the saved feasible insertion resulting in the minimum time delay or maximum travel time savings until all the unrouted customer to vehicle route combinations are exhausted; and modifying the vehicle routing plan by performing the saved feasible exchange resulting in the minimum time delay or maximum travel time savings until all the unrouted customer to vehicle route combinations are exhausted.

9. The method according to claim 8, further comprising:
terminating the method based on a number of times a near-optimal vehicle routing plan has been discovered.

10. The method according to claim 8, further comprising:
terminating the method when the method has executed over a predetermined time period.

11. A computer implemented method to reduce vehicle travel time and a number of vehicles in a vehicle routing plan having vehicle routes which include vehicles and customers serviced by the vehicles, the method comprising:

in a processor, executing cross-exchanges of the customers for combinations of vehicle routes in the vehicle routing plan, comprising:

determining a travel time or time savings of executed cross-exchanges;

saving a cross-exchange resulting in a minimal travel time or maximum travel time savings for vehicle route combinations; and modifying the vehicle routing plan by performing the saved cross-exchange resulting in the minimal travel time or maximum travel time savings until all vehicle route combinations are exhausted;

in the processor, eliminating one of the vehicles in the vehicle routing plan; and in the processor, performing insertions of unrouted customers and exchanges of unrouted customers with routed customers, comprising:

determining a minimum time delay or travel time savings for feasible insertions of an unrouted customer into a vehicle route;

saving a feasible insertion of the unrouted customer into the vehicle route resulting in a minimum time delay or maximum travel time savings;

determining the minimum time delay or maximum travel time savings for feasible exchanges of an unrouted customer into a vehicle route;

saving a feasible exchange of the unrouted customer into the vehicle route resulting in a minimum time delay or maximum travel time savings;

modifying the vehicle routing plan by performing the saved feasible insertion resulting in the minimum time delay or maximum travel time saving until all the unrouted customer to vehicle route combinations are exhausted; and modifying the vehicle routing plan by performing the saved feasible exchange resulting in the minimum time delay or maximum travel time savings until all the unrouted customer to vehicle route combinations are exhausted.

12. The method of claim 11, wherein executing cross-exchanges is performed on a first processor and eliminating one of the vehicles in the vehicle routing plan and performing insertions and exchanges of unrouted customers are performed on a second processor.

13. The method of claim 11, wherein the modified vehicle routing plan is outputted to enable routing of the vehicles.

14. A system, comprising:
a processor; and
a memory coupled to the processor, the memory including program instructions for enabling vehicle routing by:
reducing vehicle travel time and a number of vehicles in a vehicle routing plan having vehicle routes which include vehicles and customers serviced by the vehicles, comprising:
executing cross-exchanges of the customers for combinations of vehicle routes in the vehicle routing plan, comprising:
determining a travel time or time savings of executed cross-exchanges;
saving a cross-exchange resulting in a minimal travel time or maximum travel time savings for vehicle route combinations; and
modifying the vehicle routing plan by performing the saved cross-exchange resulting in the minimal travel time or maximum travel time savings until all vehicle route combinations are exhausted;
eliminating one of the vehicles in the vehicle routing plan; and
performing insertions of unrouted customers and exchanges of unrouted customers with routed customers, comprising:
determining a minimum time delay or travel time savings for feasible insertions of an unrouted customer into a vehicle route;
saving a feasible insertion of the unrouted customer into the vehicle route resulting in a minimum time delay or maximum travel time savings;
determining the minimum time delay or maximum travel time savings for feasible exchanges of an unrouted customer into a vehicle route;
saving a feasible exchange of the unrouted customer into the vehicle route resulting in a minimum time delay or maximum travel time savings;
modifying the vehicle routing plan by performing the saved feasible insertion resulting in the minimum time delay or maximum travel time savings until all the unrouted customer to vehicle route combinations are exhausted; and
modifying the vehicle routing plan by performing the saved feasible exchange resulting in the minimum time delay or maximum travel time savings until all the unrouted customer to vehicle route combinations are exhausted.

15. The system of claim 14, wherein the processor comprises a first processor and a second processor, and executing cross-exchanges is performed on the first processor and eliminating one of the vehicles in the vehicle routing plan and performing insertions and exchanges of unrouted customers are performed on the second processor.

16. The system of claim 14, wherein the modified vehicle routing plan is outputted to enable routing of the vehicles.

* * * * *